United States Patent
Miyamoto (10) Patent No.: US 10,922,839 B2
(45) Date of Patent: Feb. 16, 2021

(54) LOCATION OBTAINING SYSTEM, LOCATION OBTAINING DEVICE, LOCATION OBTAINING METHOD, AND NON-TRANSITORY COMPUTER-READABLE RECORDING MEDIUM

(71) Applicant: CASIO COMPUTER CO., LTD., Tokyo (JP)

(72) Inventor: Naotomo Miyamoto, Tokyo (JP)

(73) Assignee: CASIO COMPUTER CO., LTD., Tokyo (JP)

(\*) Notice: Subject to any disclaimer, the term of this patent is extended or adjusted under 35 U.S.C. 154(b) by 92 days.

(21) Appl. No.: 16/177,536

(22) Filed: Nov. 1, 2018

(65) Prior Publication Data
US 2019/0139260 A1    May 9, 2019

(30) Foreign Application Priority Data

Nov. 7, 2017 (JP) .................. 2017-215016
Oct. 2, 2018 (JP) .................. 2018-187158

(51) Int. Cl.
*G06K 7/10* (2006.01)
*G06T 7/73* (2017.01)
(Continued)

(52) U.S. Cl.
CPC .................. *G06T 7/74* (2017.01); *G01C 3/14* (2013.01); *G02B 7/32* (2013.01); *G06T 7/73* (2017.01);
(Continued)

(58) Field of Classification Search
CPC ... G06K 7/10722; G06K 7/14; G06K 7/10851
(Continued)

(56) References Cited

U.S. PATENT DOCUMENTS 9,519,976 B1    12/2016  Saltzman
10,083,522 B2 *  9/2018  Jovanovic .............. G06T 7/13
(Continued)

FOREIGN PATENT DOCUMENTS

JP    2004-361222 A    12/2004
JP    2005-174148 A     6/2005
(Continued)

OTHER PUBLICATIONS

Extended European Search Report dated Feb. 15, 2019 in European Patent Application No. 18 20 4684.7.

*Primary Examiner* — Ahshik Kim
(74) *Attorney, Agent, or Firm* — Scully Scott Murphy & Presser (57) ABSTRACT

A server detects first light sources and the like within each image captured by cameras, and obtains a relative spatial location and shooting direction between the cameras using an algorithm in accordance with a detection count of the first light sources. Further, the server reads location information occurring in a space for the first light sources and the like stored in a memory, finds a spatial location and a shooting direction within the space for the cameras, and further finds a conversion matrix capable of converting a combination of image positions of the first light sources imaged by the camera and image positions of the first light sources imaged by the camera into installation locations of the first light sources and the like within the space.

12 Claims, 8 Drawing Sheets

(51) Int. Cl.
  *G06T 7/00* (2017.01)
  *G01C 3/14* (2006.01)
  *G02B 7/32* (2021.01)

(52) U.S. Cl.
  CPC ...... *G06T 7/97* (2017.01); *G06T 2207/10012* (2013.01); *G06T 2207/30244* (2013.01)

(58) Field of Classification Search
  USPC .......................................................... 235/454
  See application file for complete search history.

(56) References Cited

U.S. PATENT DOCUMENTS

| | | | |
|---|---|---|---|
| 2008/0075324 A1 | 3/2008 | Sato et al. | |
| 2009/0195557 A1 | 8/2009 | Nakamura | |
| 2014/0333727 A1* | 11/2014 | Mamiya | G01B 11/2531 |
| | | | 348/46 |
| 2015/0323647 A1* | 11/2015 | Jones | G01S 1/70 |
| | | | 356/614 |
| 2017/0187454 A1* | 6/2017 | Zhang | H04B 10/116 |

FOREIGN PATENT DOCUMENTS

| | | |
|---|---|---|
| JP | 2006-030127 A | 2/2006 |
| JP | 2012-057967 A | 3/2012 |
| WO | 02/063240 A1 | 8/2002 |

\* cited by examiner

LOCATION OBTAINING SYSTEM, LOCATION OBTAINING DEVICE, LOCATION OBTAINING METHOD, AND NON-TRANSITORY COMPUTER-READABLE RECORDING MEDIUM

CROSS-REFERENCE TO RELATED APPLICATION

This application claims the benefit of Japanese Patent Application No. 2017-215016, filed on Nov. 7, 2017, and the benefit of Japanese Patent Application No. 2018-187158, filed on Oct. 2, 2018, the entire disclosure of which is incorporated by reference herein.

FIELD

The present disclosure relates to a location obtaining system, a location obtaining device, a location obtaining method, and a non-transitory computer-readable recording medium.

BACKGROUND

Technology exists for calculation of an actual position of an object present within a prescribed space on the basis of images captured by a stereo camera as described in Unexamined Japanese Patent Application Kokai Publication No. 2004-361222.

This technology enables the obtaining of the position of the object using just the acquired stereo image, without use of a tool for direct measurement.

SUMMARY

A location obtaining system according to the present disclosure includes:

first light-emitting devices configured to emit light, each first light-emitting device of the first light-emitting devices disposed in a prescribed space;

a specifier configured to specify locations within the prescribed space of the first light-emitting devices;

imaging devices configured to capture images of the prescribed space from mutually different directions; and an obtainer configured to obtain an installation location or a shooting direction of each imaging device of the imaging devices based on (i) positions on the images of lights of the first light-emitting devices included in common in the images captured by the imaging device, and (ii) locations within the prescribed space of the first light-emitting devices specified by the specifier.

A location obtaining device according to the present disclosure includes:

a specifier configured to specify locations within a prescribed space of first light-emitting devices disposed within the prescribed space; and an obtainer configured to obtain an installation location or a shooting direction of each of imaging devices capturing images, based on (i) positions on the images of lights of the first light-emitting devices included in common in the images of the prescribed space captured from mutually different directions, and (ii) locations within the prescribed space of the first light-emitting devices specified by the specifier.

A location obtaining method according to the present disclosure includes:

specifying locations in a prescribed space for light-emitting devices disposed within the prescribed space; and obtaining an installation location or a shooting direction of each of imaging devices capturing images, based on (i) positions on the images of lights of the light-emitting devices included in common in the images of the prescribed space captured from mutually different directions, and (ii) the specified locations within the prescribed space of the light-emitting devices.

A non-transitory computer-readable recording medium according to the present disclosure records a computer-executable program of a location obtaining device connected to imaging devices for capturing images from mutually different directions of a prescribed space in which light-emitting devices are disposed. The program causes the computer to function as:

a specifier configured to specify locations within the prescribed space of the light-emitting devices disposed within the prescribed space; and an obtainer configured to obtain an installation location or a shooting direction of each of imaging devices capturing images, based on (i) positions on the images of lights of the light-emitting devices included in common in the images of the prescribed space captured from mutually different directions, and (ii) locations within the prescribed space of the light-emitting devices specified by the specifier.

BRIEF DESCRIPTION OF THE DRAWINGS

A more complete understanding of this application can be obtained when the following detailed description is considered in conjunction with the following drawings, in which.

DETAILED DESCRIPTION

A visible light communication system as an information processing system according to an embodiment of the present disclosure is described below with reference to drawings.

Figure 1:
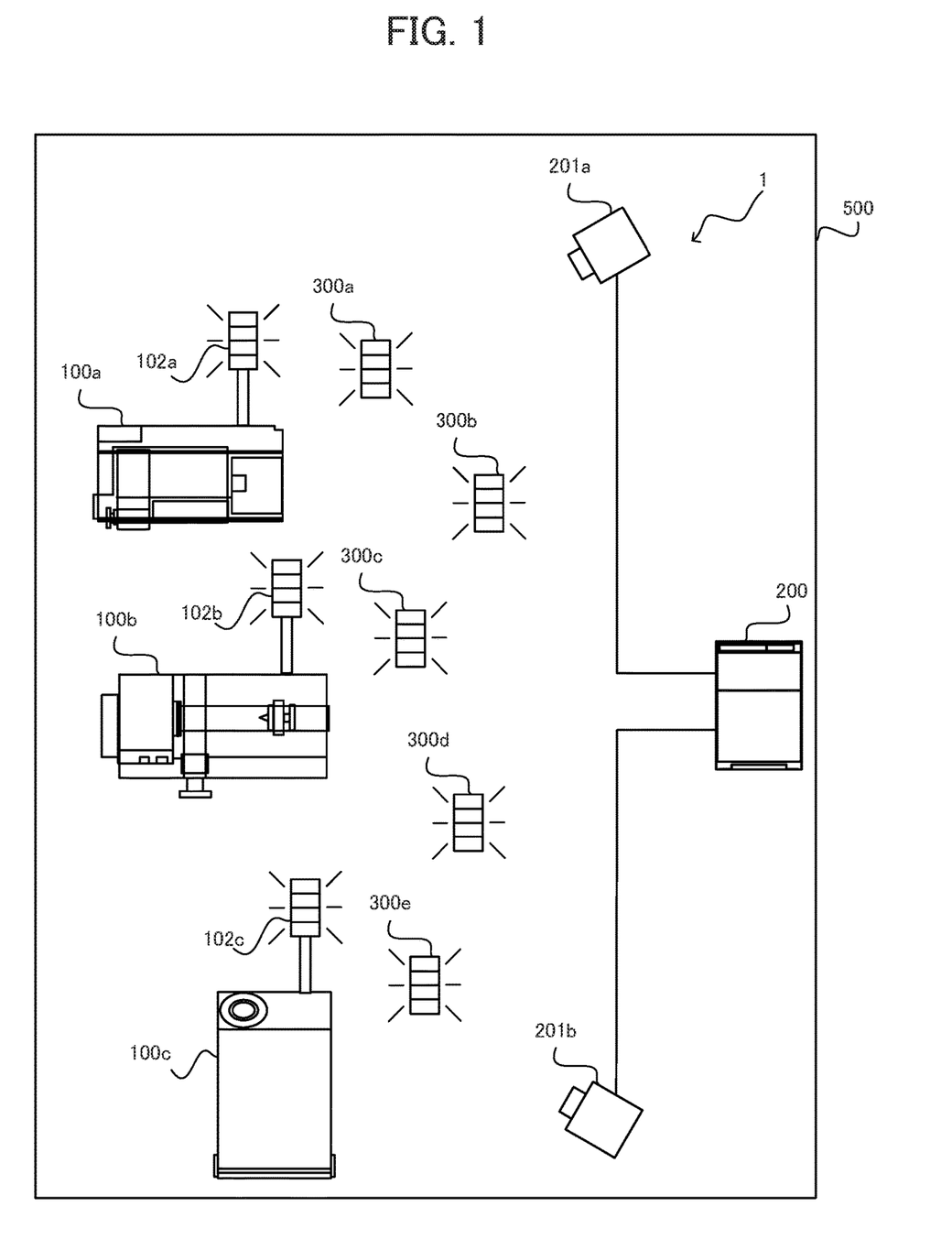
FIG. 1 is drawing illustrating an example of a visible light communication system according to an embodiment of the present disclosure.

FIG. 1 is a drawing illustrating a configuration of the visible light communication system. As illustrated in FIG. 1, a visible light communication system 1 is configured to include: equipment units 100a, 100b, and 100c (appropriately abbreviated as "equipment unit 100" hereinafter when not limited to each of the equipment units 100a, 100b, and 100c) installed within a space 500, and a server 200 corresponding to a location obtaining device.

A second light source 102a corresponding to the second light-emitting device is attached to the equipment unit 100a, the second light source 102b corresponding to the second light-emitting device is attached to the equipment unit 100b, and the second light source 102c corresponding to the second light-emitting device is attached to the equipment unit 100c (referred to appropriately below as the "second light source 102" when not limited to the second light source 102a, 102b, or 102c). Cameras 201a and 201b (the "camera group" including the cameras 201a and 201b are referred to below as the "camera 201" when not limited to the camera 201a or 201b) corresponding to imaging devices are attached to a server 200. Further, first light sources 300a, 300b, 300c, 300d, and 300e (referred to appropriately below as the "first light source 300" when not limited to the first light source 300a, 300b, 300c, 300d, or 300e) corresponding to first light-emitting devices are arranged within the space 500. The first light source 300 and the second light source 102 include non-illustrated light emitting diodes (LEDs).

In the present embodiment, the second light source 102 attached to the equipment unit 100 transmits information by emitting light corresponding to information of various types of transmission targets such as a state of the equipment unit 100. In contrast, the server 200 demodulates changes in emitted light color occurring in an image of light obtained from a continued time-series of imaging by the camera 201, and thus acquires the information emitted by the second light source 102.

In the present embodiment, the locations and shooting directions of the cameras 201a and 201b are initially unknown. Thus prior to the aforementioned server 200 acquiring the state and the like of the equipment 100, firstly the server 200, on the basis of positions (image positions) of the first light sources 300a, 300b, 300c, 300d, and 300e within the images obtained from imaging by the cameras 201a and 201b, calculates (obtains) the locations (spatial locations) and shooting directions of the cameras 201a and 201b occurring in the space 500 that is the three-dimensional space. Further, the server 200 generates a conversion matrix for converting the positions (image positions) of the first light sources 300 within the image to installation locations within the space 500.

Figure 2:
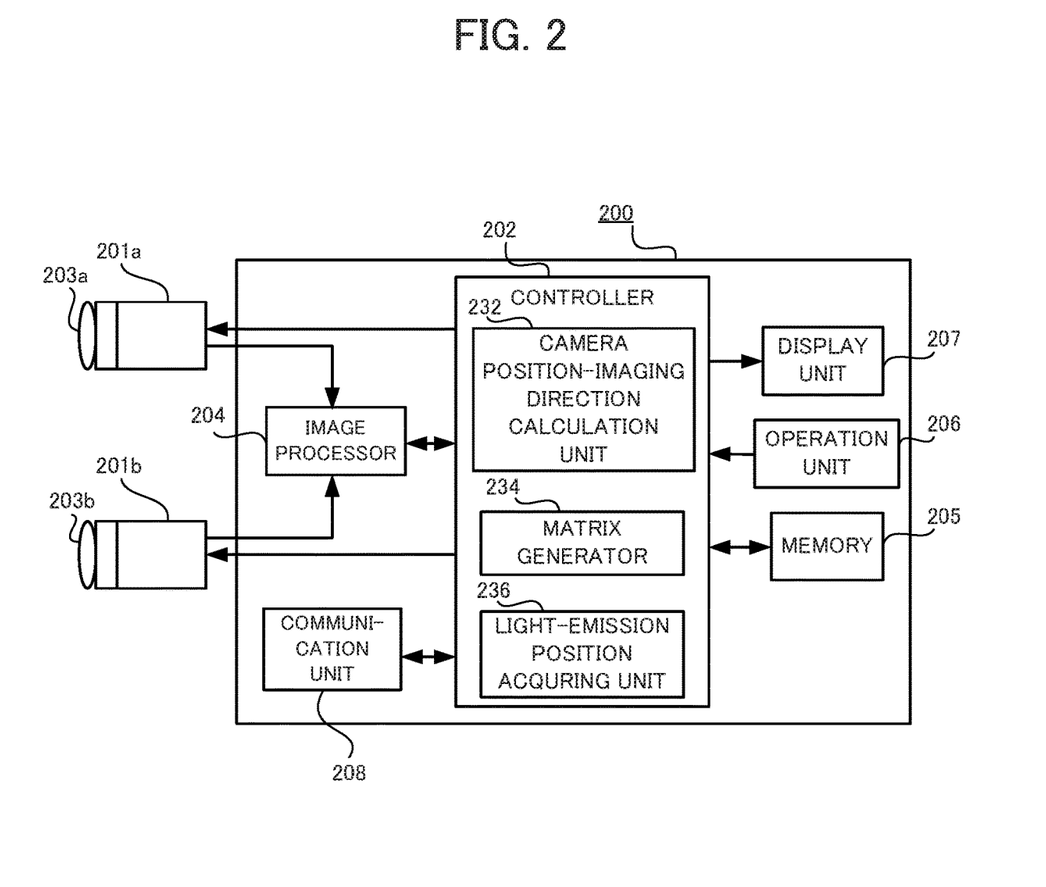
FIG. 2 is a drawing illustrating an example of configuration of a server according to the embodiment.

FIG. 2 is a drawing illustrating an example of configuration of the server 200. As illustrated in FIG. 2, the server 200 includes a controller 202, an image processor 204, a memory 205, an operation unit 206, a display unit 207, and a communication unit 208. Further, the cameras 201a and 201b are attached to the server 200 through wires.

The camera 201a includes a lens 203a, and the camera 201b includes a lens 203b (referred to appropriately below as the "lens 203" when not limited to the lens 203a or 203b). The lens 203 is configured as a lens such as a zoom lens. The lens 203 moves due to zoom control operation by the operation unit 206 and focus control by the controller 202. Image angular field and an optical image captured by the camera 201 are controlled by movement of the lens 203.

The cameras 201a and 201b each include light-receiving elements that are regularly arrayed in a two-dimensional array on light-receiving surface. Examples of the light-receiving element include imaging devices such as a charge coupled device (CCD), a complementary metal oxide semiconductor (CMOS), and the like. On the basis of a control signal from the controller 202, the camera 201a and the camera 201b each capture an optical image of light input through the lens 203 over an image angular field of a predetermined range, convert an image signal within the image angular field to digital data, and generate a frame.

Further, the cameras 201a and 201b continue to generate the images and the frames over time, and output the successive frames to the image processor 204 within the server 200.

On the basis of a control signal from the controller 202, the image processor 204 outputs as is to the controller 202 the frames (digital data) output from the camera 201, and the image processor 204 adjusts image quality and image size for the frames to be displayed as an on-screen live image by the display unit 207, and outputs the adjusted frames to the controller 202. Further, the image processor 204 has functions for, when a control signal is input on the basis of a recording command operation from the operation unit 206, encoding and generating a file in a compressed encoding format such as the joint photographic experts group (JPEG) format from an optical image within a display range displayed by the display unit 207 or within the image angular field occurring in the camera 201 at the time of the command for recording.

The controller 202 includes, for example, a central processing unit (CPU). By executing software processing in accordance with programs (such as a program for achieving the operation of the server 200 illustrated in FIG. 3 below) stored in the memory 205, the controller 202 controls various types of functions with which the server 200 is equipped.

The memory 205 is a memory such as random access memory (RAM) or read only memory (ROM). The memory 205 stores various types of information, such as programs, used for control and the like occurring at the server 200.

The operation unit 206 includes components such as a numeric keypad and functions keys, and is an interface that is used for input of operational content by a user. The display unit 207 includes a display such as a liquid crystal display (LCD), a plasma display panel (PDP), an electro-luminescence (EL) display, and the like. The display unit 207 displays an image in accordance with the image signal output by the controller 202. The communication unit 208, for example, is a local area network (LAN) card. The communication unit 208 performs communication with an external communication device.

The controller 202 includes: a location and shooting direction calculation unit 232 corresponding to a specifier, an obtainer, a decoder, a second acquirer, and a setter; a matrix generator 234 corresponding to a first determiner, a first controller, a second determiner, and a second controller; and a light-emission position acquiring unit 236 corresponding to a converter, a first acquirer, and a location information acquirer.

The location and shooting direction calculation unit 232 detects a position (image position) of the first light source 300 within each image obtained by the imaging of the cameras 201a and 201b. Here, the installation locations of the first light sources 300a, 300b, 300c, 300d, and 300e within the space 500 are measured beforehand. Further, the first light sources 300a, 300b, 300c, 300d, and 300e emits light that varies cyclically in a three-color pattern of red (R), green (G), and blue (B) light modulated by a uniquely specifiable ID of the local device.

The location and shooting direction calculation unit 232 detects the light of the cyclic three-color pattern included in each of the images captured by the cameras 201a and 201b. Further, the location and shooting direction calculation unit 232 attempts detection of the ID corresponding to the pattern of such three-color emitted light and demodulation into the ID. The memory 205 stores the installation location and the ID in association with each other for each of the first light sources 300a, 300b, 300c, 300d, and 300e. In the case in which the same ID can be detected from both images captured by the camera 201a and 201b, the location and shooting direction calculation unit 232 is regarded to be capable of detecting the first light source 300 corresponding to such an ID. Further, the location and shooting direction calculation unit 232 is aware of a detection count of the first light sources 300.

Thereafter, the location and shooting direction calculation unit 232, in accordance with the count of first light sources 300 included in the image, sets an algorithm for calculating the spatial locations and the shooting directions of the cameras 201a and 201b. For example, algorithms are prepared and stored in the memory 205 for each count of the first light sources 300 included in the image, such as a 5-point algorithm to be used in the case in which the number of the first light sources 300 included in the image is 5, and an 8-point algorithm to be used in the case in which the number is 8.

Thereafter, the location and shooting direction calculation unit 232 uses the set algorithm to calculate the spatial locations and the shooting directions of the cameras 201a and 201b.

Figure 3:
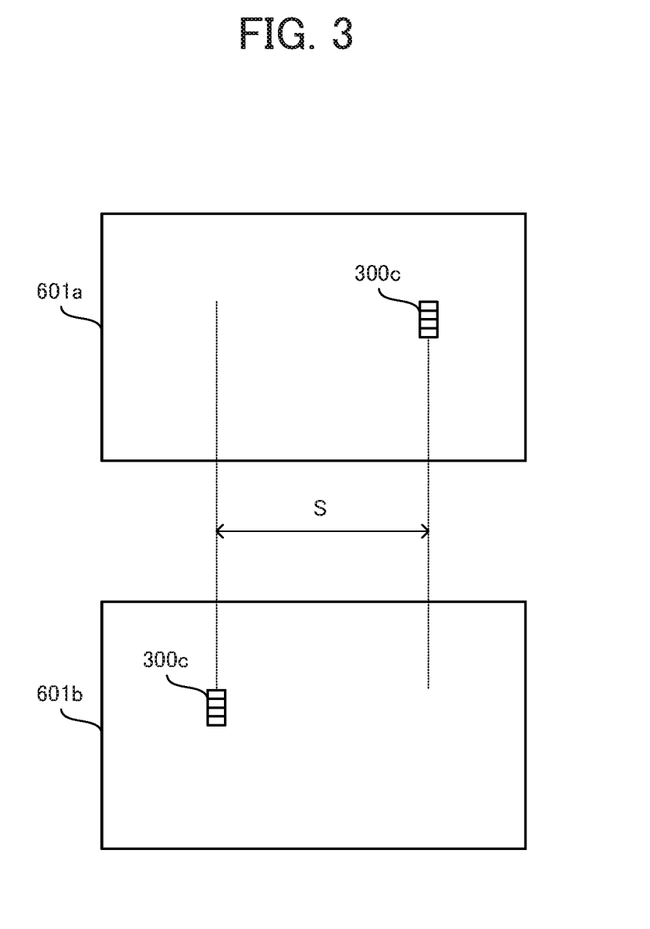
FIG. 3 is a drawing illustrating an example of parallax found from images captured by two cameras according to the embodiment.

The algorithm is described below. FIG. 3 is a drawing illustrating an example of parallax found from the images imaged by the cameras 201a and 201b. Further, FIG. 4 is a drawing illustrating an example of calculation of the spatial locations and the shooting directions of the cameras 201a and 201b.

As illustrated in FIG. 3, in the case in which the same first light source 300c is imaged by the cameras 201a and 201b, due to differences in the installation locations of the cameras 201a and 201b, a difference (parallax) S occurs between the image position of the first light source 300c within an image 601a obtained by imaging of the camera 201a and the image position of the first light source 300c within an image 601b obtained by imaging of the camera 201b.

Figure 4:
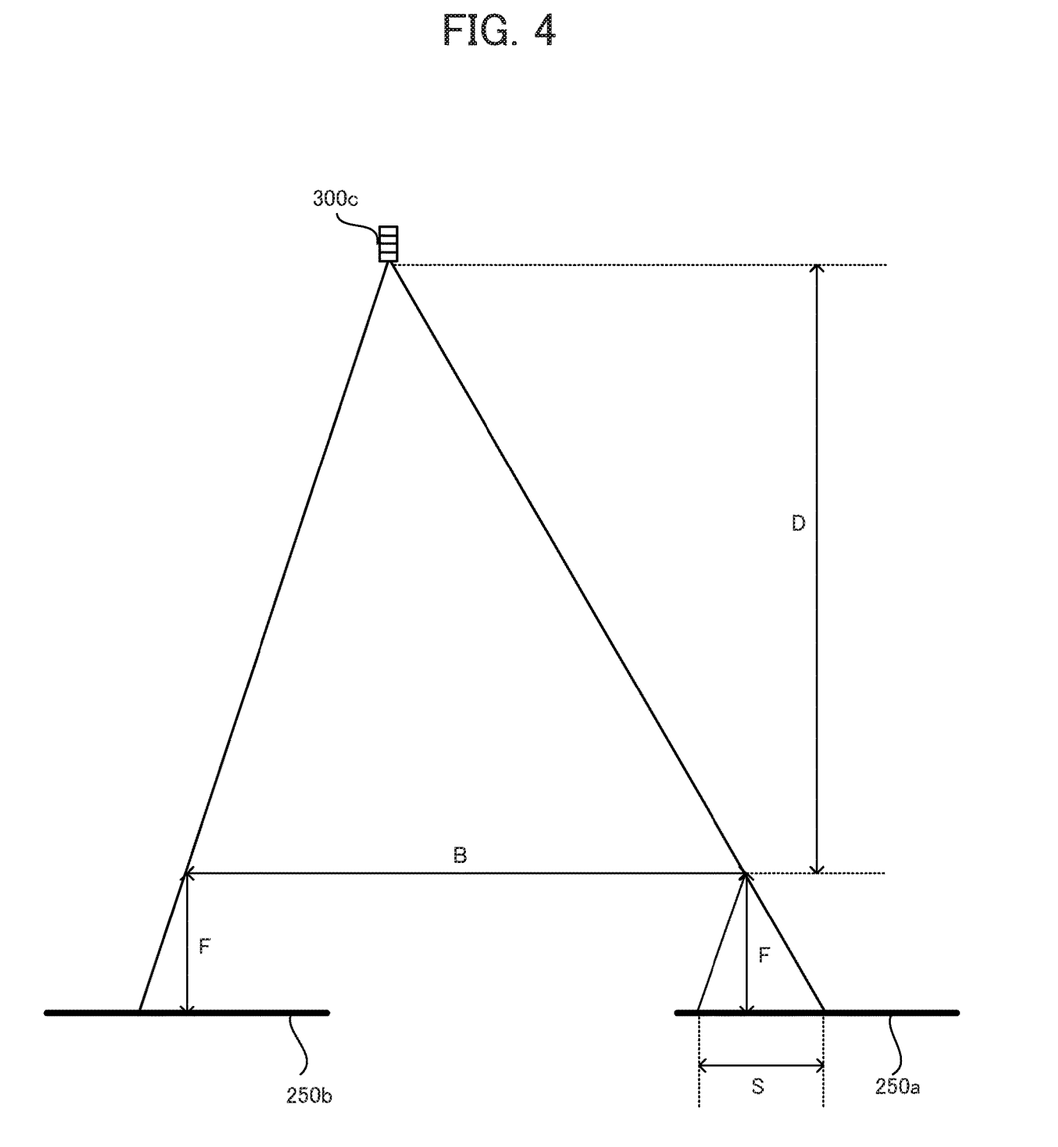
FIG. 4 is a drawing illustrating an example of calculation of spatial locations and shooting directions of the two cameras according to the embodiment.

Further, as illustrated in FIG. 4, assuming that the distance to the focal position from an image plane 250a of the camera 201a and the distance to the focal position from an image plane 250b of the camera 201b is the same value F, assuming that the distance between the camera 201a and the camera 201b is B, and assuming that the shortest distance between the first light source 300c and a straight line interconnecting the focal position of the camera 201a and the focal position of the camera 201b is D, then the distance D is calculated by a formula D=B×F/S. In this formula, F and S are known beforehand.

In the present embodiment, the location and shooting direction calculation unit 232, in addition to obtaining a distance calculation formula concerning the first light source 300c, obtains a distance calculation formula concerning each of the detected first light sources 300. Further, the location and shooting direction calculation unit 232 calculates the spatial locations and the shooting directions of the cameras 201a and 201b on the basis of the obtained distance calculation formula and previously measured installation locations of the first light sources 300.

In particular, the location and shooting direction calculation unit 232 firstly finds spatial locations and shooting directions of the camera 201a and the camera 201b relative to each other, on the basis of a combination of image positions (Xga1, Yga1) of first light sources 300 included in the image captured by the camera 201a and image positions (Xgb1, Ygb1) of first light sources 300 included in the image captured by the camera 201b. Then the location and shooting direction calculation unit 232 reads out the installation locations of each of the first light sources 300a to 300e stored in the memory 205 with reference to the IDs of the first light sources 300a to 300e, and uses the read-out installation locations to calculate the spatial locations and the shooting directions of the camera 201a and the camera 201b occurring in the space 500. Then the matrix generator 234, on the basis of the spatial locations and the shooting directions of the camera 201a and the camera 201b, finds a conversion matrix capable of converting, from the combination of the image positions of first light sources 300 included in the image captured by the camera 201a and image positions of first light sources 300 included in the image captured by the camera 201b, into the installation locations of the first light sources 300 within the space 500.

Each of the second light sources 102a, 102b, and 102c emits light that changes cyclically in a pattern of the three colors red (R), green (G), and blue (B) modulated by the uniquely specifiable ID of the second light source itself.

After finding of the aforementioned conversion matrix, the light-emission position acquiring unit 236 detects the light of the cyclical three-color pattern included in each image captured by the cameras 201a and 201b. Further, the light-emission position acquiring unit 236 detects the ID corresponding to this three-color emitted light pattern and attempts to demodulate the three-color emitted light pattern into the ID. In the case in which the same ID is detected in images captured by both of the camera 201a and 201b, the light-emission position acquiring unit 236 regards the second light source 102 corresponding to such an ID as capable of being detected.

Further, the light-emission position acquiring unit 236 recognizes the image position (Xga2, Yga2) within the image captured by the camera 201a and the image position (Xgb2, Ygb2) within the image captured by the camera 201b that correspond to the same second light source 102. Further, the light-emission position acquiring unit 236 uses the combination of this image position (Xga2, Yga2) and this image position (Xgb2, Ygb2) and the aforementioned conversion matrix to calculate an installation location (Xk2, Yk2, Zk2) within the space 500.

Figure 5:
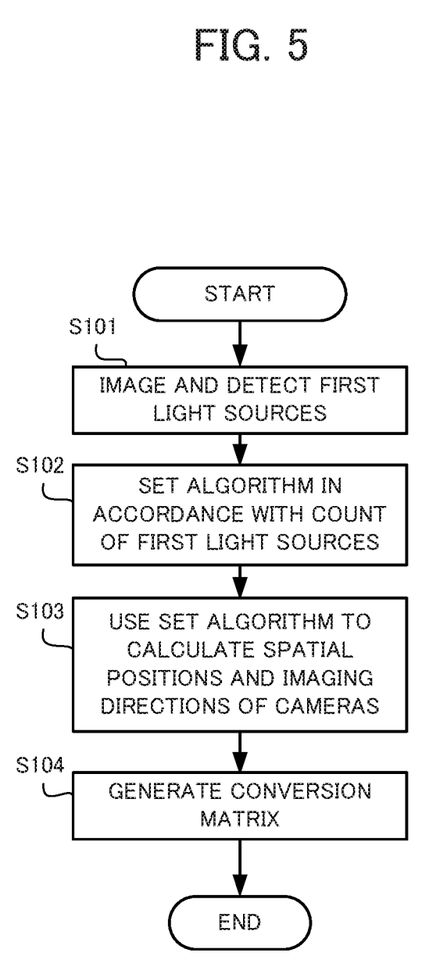
FIG. 5 is a flowchart illustrating an example of operation of the server according to the embodiment.

Operation of the server 200 is described next with reference to a flowchart. FIG. 5 is a flowchart illustrating an example of operation of the server 200.

The cameras 201a and 201b perform imaging within the space 500. The location and shooting direction calculation unit 232 within the controller 202 detects the first light sources 300 within each of the images captured by the cameras 201a and 201b (step S101).

Thereafter, the location and shooting direction calculation unit 232 recognizes a count of the first light sources 300 within each image captured by the cameras 201a and 201b. Further, the location and shooting direction calculation unit 232 sets the algorithm for calculation of the spatial locations and shooting directions of the cameras 201a and 201b relative to each other on the basis of the count of the first light sources 300 included in the images (step S102).

Thereafter, the location and shooting direction calculation unit 232 uses the set algorithm to calculate the spatial locations and shooting directions of the cameras 201a and 201b relative to each other (step S103).

Next, the location and shooting direction calculation unit 232 reads out from the memory 205 the installation locations corresponding to the IDs of the first light sources 300a to 300e, and uses the read-out installation locations to calculate the spatial locations and the shooting directions of the cameras 201a and 201b within the space 500. Further, the matrix generator 234, on the basis of the calculated spatial locations and shooting directions of the camera 201a and the camera 201b occurring in the space 500, generates the conversion matrix capable of converting to the installation locations of the first light sources 300 within the space 500 from the combination of the image positions of the first light sources 300 included in the image captured by the camera 201a and the image positions of the first light sources 300 included in the image captured by the camera 201b (step S104).

Thereafter, the light-emission position acquiring unit 236 recognizes the image position (Xga2, Yga2) within the image captured by the camera 201a and the image position (Xgb2, Ygb2) within the image captured by the camera 201b that correspond to the same second light source 102. Further, the light-emission position acquiring unit 236 uses the combination of this image position (Xga2, Yga2) and this image position (Xgb2, Ygb2) and the aforementioned conversion matrix to calculate the installation location (Xk2, Yk2, Zk2) within the space 500.

In the present embodiment in this manner, within each of the images captured by the cameras 201a and 201b, the server 200 detects the first light sources 300 that are allocated respective IDs, and firstly calculates the spatial locations and shooting directions of the cameras 201a and 201b relative to each other using the algorithm corresponding to the detection count. Thereafter, from the installation locations of each of the first light sources 300 within the space 500 corresponding to the respective IDs allocated to the first light sources 300, the spatial locations and the shooting directions within the space 500 of the cameras 201a and 201b are calculated, and the conversion matrix is generated that is capable of converting the image positions of the first light sources 300 included in the images captured by the cameras 201a and 201b into the installation locations of the first light sources 300. Thus even when the spatial locations and the shooting directions of the cameras 201a and 201b are unknown, such spatial locations and shooting directions can be acquired, and can be used to acquire the installation locations of the second light sources 102.

Further, the server 200 can generate the conversion matrix that converts the combination of the image positions of the first light sources 300 included in the image obtained by the imaging by the camera 201a and the image positions of the first light sources 300 included in the image obtained by the imaging by the camera 201b into the installation locations of the first light sources 300 within the space 500, and by using this conversion matrix, the server 200 can convert the combination of image positions of the second light sources 102 in the images captured by the camera 201b and the image positions of the second light sources 102 included in the images captured by the camera 201a into the installation locations of the second light sources 102 within the space 500. This enables easy acquisition of the installation locations of the second light sources 102 within the space 500.

Figure 6:
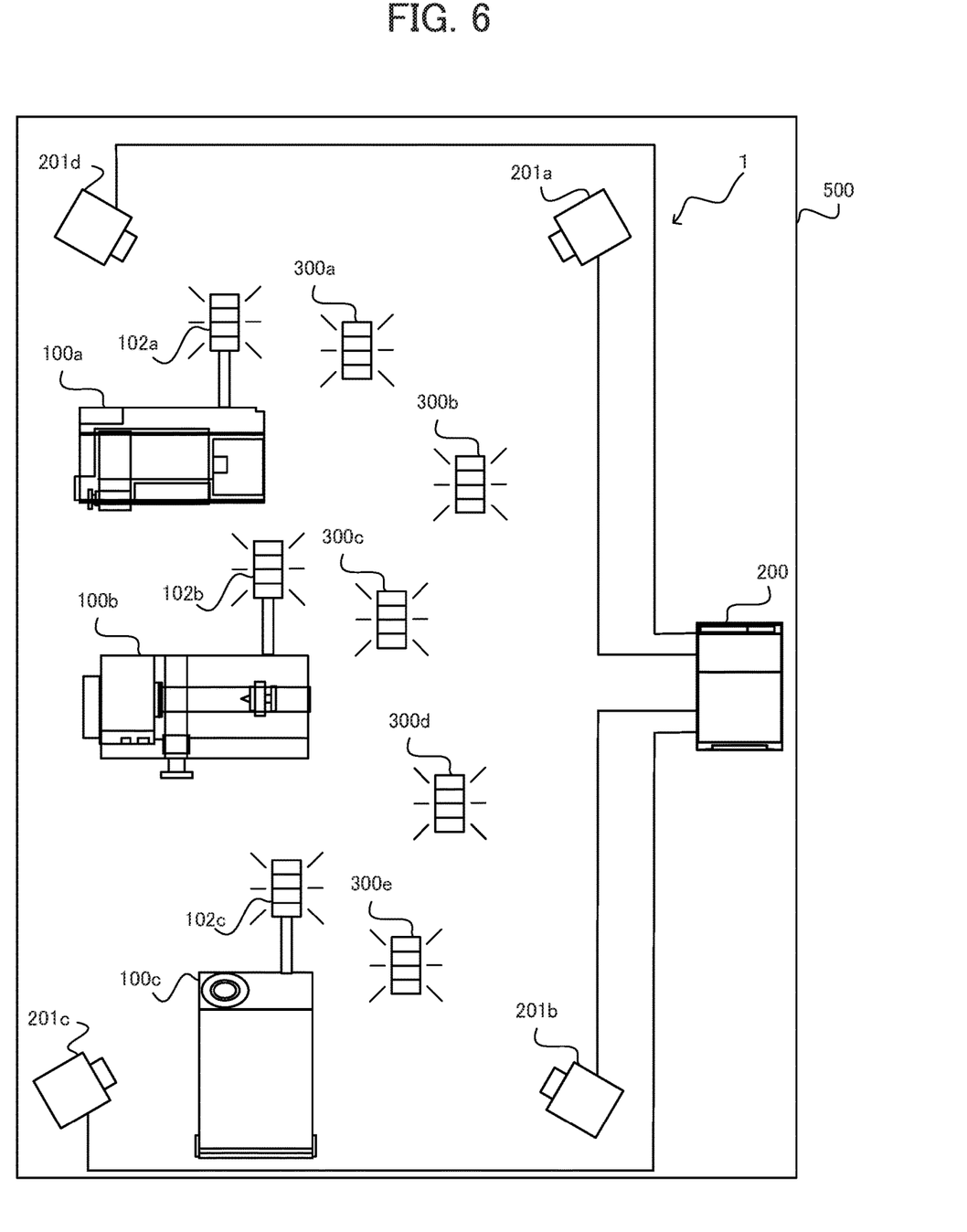
FIG. 6 is a drawing illustrating an example of another optical light communication system according to another embodiment of the present disclosure.

The number of the cameras 201 is not limited to two cameras, and the number of cameras may be three or more. For example, as illustrated in FIG. 6, in the case in which the cameras 201a, 201b, 201c, and 201d are arranged, the server 200 is equipped with two-camera combinations (camera pairs) of the cameras 201a to 201d. This results in six combinations each as pairs of the cameras 201.

Further, the server 200, in a manner similar to that described above, acquires installation locations of the second light-emitting devices 102 within the space 500 on the basis of captured images for each pair of the cameras 201 forming a camera pair. That is, the light-emission position acquiring unit 236 generates the conversion matrix for converting, to installation locations of first light sources 300 within the space 500, combinations of (i) image positions of first light sources 300 included in images captured by one of the cameras 201 among a camera pair and (ii) image positions of the first light sources 300 included in images captured by another camera 201 of the camera pair. The conversion matrix is generated for each camera pair.

Further, the server 200 uses this conversion matrix to convert, to installation locations of the second light sources 102 within the space, the combination of the image position of the second light sources 102 included in the image captured by one camera 201 and the image position of the second light sources 102 included in the image captured by another camera 201. These installation locations can be expressed, for example, as certain coordinate data of a spatial coordinate system. The server 200 consolidates the installation locations of the second light sources 102 within the space 500 for each of the six camera pairs, for example, by acquiring average values of the installation locations, thereby enabling final acquisition of the installation locations of the second light sources 102 within the space 500.

Figure 7:
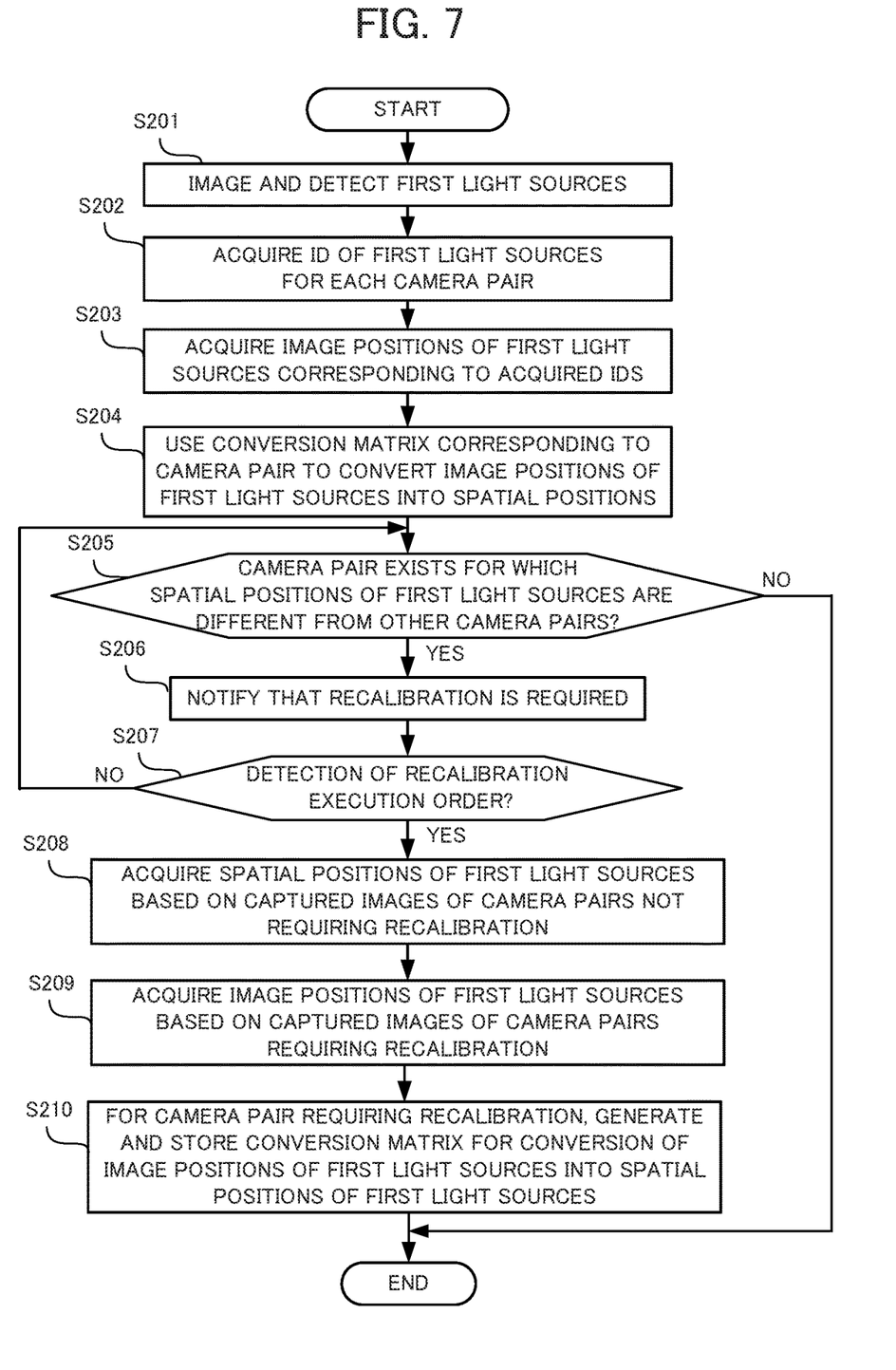
FIG. 7 is a flowchart illustrating an example of operation of the server according to the same embodiment.

Further, some of the cameras 201 may move, or may fail and then be replaced, thereby changing the locations or imaging ranges of such cameras 201. In such cases, the server 200 performs the below described operation. FIG. 7 is a flowchart illustrating an example of operation of the server 200. Further, the operation of FIG. 7 is applicable under conditions in which three or more cameras 201 are installed for which the location and imaging range do not change.

The cameras 201 capture images within the space 500. The light-emission position acquiring unit 236 within the controller 202 at this time detects that first light sources 300 are included in both images captured by the cameras 201 (step S201). Next, the light-emission position acquiring unit 236 sets camera pairs, each pair formed by two of the cameras 201. Further, the light-emission position acquiring unit 236, for each of the camera pairs, acquires IDs of the first light sources 300 included in both images captured by the cameras 201 within the camera pair (step S202).

Further, the location and shooting direction calculation unit 232, for each of the camera pairs, acquires a position (image position) of the first light sources 300 for which the IDs are detected in step S202 and which occur in both images captured by the two cameras 201 included in the camera pair (step S203).

Thereafter, the light-emission position acquiring unit 236 uses the conversion matrix corresponding to the camera pair, and converts the images positions of the first light sources 300 acquired in step S203 into spatial locations of the first light sources 300 occurring in the space 500 (step S204). The operation of the aforementioned steps S202 to S204 is performed for each camera pair.

After the operation of steps S202 to S204 is performed for each of the camera pairs, the matrix generator 234, for the various first light sources 300, compares the spatial locations of the first light source 300 obtained by each camera pair, and determines whether another camera pair exists for which the spatial location of the first light source 300 is different (step S205). Specifically, the matrix generator 234 compares the spatial locations of the first light source 300 acquired by each camera pair, and specifies a pair for which the spatial location of the first light source 300 does not match any of the other camera pairs.

The sequential operation ends if there no other camera pair exists for which the spatial location of the first light source 300 is different (NO in step S205).

However, in the case in which another camera pair exists for which the spatial location of the first light source 300 is different (YES in step S205), the matrix generator 234, among the two cameras 201 within the camera pair for which the spatial location of the first light source 300 is different from that of other camera pairs, specifies a camera 201 for which the location or the imaging range is changed. Here, the matrix generator 234 specifies, as the camera 201 for which the location or imaging range is changed, the camera 201 that is not included in any of the camera pairs for which the first light source 300 spatial location matches that of other camera pairs. Further, the matrix generator 234 notifies a user that reacquisition (recalibration) of the spatial location and the shooting direction is required for the camera 201 for which the location or imaging range is changed (step S206). The notification is performed by display and the like on a non-illustrated display.

Upon receiving notification that recalibration is required, the user adjusts the location or angle of view of the recalibration-requiring camera 201 so as to include a prescribed number (at least one) of the first light sources 300 in the imaging range of the recalibration-requiring camera 201. Thereafter, the user orders execution of the recalibration by actions such as operating a non-illustrated operation unit.

The matrix generator 234 determines whether the execution of recalibration is previously ordered by the user (step S207). In the case in which there is no previous ordering of the execution of recalibration (NO in step S207), the operations of step S205 and beyond are repeated.

However, in the case in which the execution of recalibration is previously ordered (YES in step S207), the light-emission position acquiring unit 236 acquires the spatial location of the first light source 300 on the basis of the captured images of the camera pairs including only the cameras 201 not requiring recalibration (step S208). Specifically, operations similar to those of steps S201 to S204 are performed on the basis of the captured images of the camera pairs including only the cameras 201 not requiring recalibration.

Further, the matrix generator 234 acquires the image position of the first light source 300 on the basis of the captured images of the camera pair including the camera 201 requiring recalibration (step S209). Specifically, operations similar to those of steps S201 to S203 are performed on the basis of the captured images of the camera pair that includes the camera 201 requiring recalibration.

Further, the matrix generator 234 generates a conversion matrix for converting, to the spatial location of the first light source 300, the image positions imaged previously in step S209 of the first light source 300 corresponding to the camera pair including the camera 201 requiring recalibration, and the matrix generator 234 stores the generated conversion matrix in the memory 205 (step S210).

Although conventionally all calibrations must be redone in the case in which the position or the imaging range of the camera 201 is previously changed, the installation locations of each of the light sources 102 within the space 500 can be easily acquired by generating the new conversion matrix in accordance with the change of position or imaging range of the camera 201 in the aforementioned manner.

Figure 8:
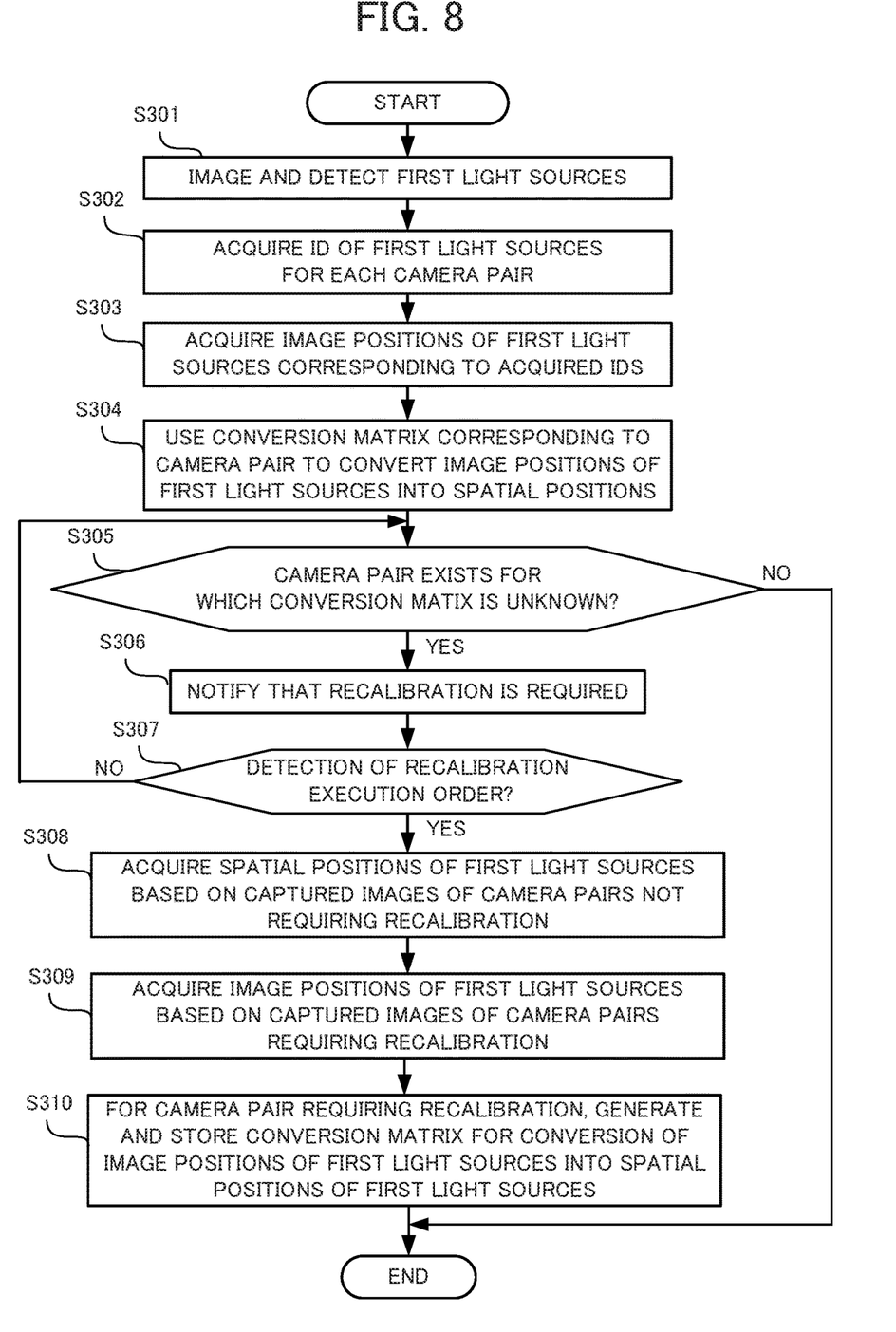
FIG. 8 is a flowchart illustrating another example of operation of the server according to the same embodiment.

Further, in some cases a new camera 201 is installed due to causes such as expansion of the space 500. In such a case, the server 200 performs the below described operations. FIG. 8 is a flowchart illustrating an example of operation of the server 200. In the description below, a case is described in which a single camera 201 is added in a state in which two or more cameras 201 are previously arranged.

Description of the operations of steps S301 to S304 is omitted due to similarity to the operations of steps S201 to S204 of FIG. 7.

Upon performance of the operations of steps S302 to S304 for each of the camera pairs, the matrix generator 234 determines whether a camera pair exists for which the conversion matrix is unknown due to expansion of the space 500, that is, a camera pair imaging space for which the conversion matrix is not set due to expansion of the space 500 (step S305). Specifically, in step S305, the light-emission position acquiring unit 236 determines whether conversion matrices exist to be used during conversions of imaging positions of the first light sources 300 to spatial locations.

In the case in which no camera pair exists for which the conversion matrix is unknown (NO in step S305), the series of operations ends.

However, in the case in which a camera pair exists for which the conversion matrix is unknown (YES in step S305), the added camera 201 is specified from among the two cameras 201 of the camera pair for which the conversion matrix is unknown. Here, the matrix generator 234 identifies the added camera 201 as the camera 201 that is not included in any of the camera pairs corresponding to the conversion matrices stored in the memory 205 at that time. Further, the matrix generator 234 notifies the user of the requirement for acquiring (recalibrating) the spatial location and shooting direction of the added camera 201 (step S306). The notification is performed by display and the like on the non-illustrated display.

Upon receiving the notification that the recalibration is required, the user adjusts the position of the angle of view of the recalibration-target camera 201 so as to include a prescribed number (at least one) of the first light sources 300 in the imaging range of the recalibration-requiring camera 201. Thereafter, the user orders execution of the recalibration by actions such as operating the non-illustrated operation unit.

Thereafter, operations are performed that are similar to steps S207 to S210 of FIG. 7. That is to say, the matrix generator 234 determines whether the execution of recalibration is previously ordered by the user (step S307). In the case in which there is no previous ordering of the execution of recalibration (NO in step S307), the operations of step S305 and beyond are repeated.

However, in the case in which the execution of recalibration is previously ordered (YES in step S307), the light-emission position acquiring unit 236 acquires the spatial location of the first light source 300 on the basis of the captured images of the camera pairs including only the cameras 201 not requiring recalibration (step S308). In this case, both before the expansion of the space and after expansion of the space, the space in which the first light sources 300 are present includes roughly the same number of light sources.

Further, the matrix generator 234 acquires the image positions of the first light sources 300 on the basis of the captured images of the camera pairs including the cameras 201 requiring recalibration (step S309).

Further, the matrix generator 234 generates a conversion matrix for converting, to the spatial locations of the first light sources 300, the image positions imaged previously in step S309 of the first light sources 300 corresponding to the camera pairs including the cameras 201 requiring recalibration, and the matrix generator 234 stores the generated conversion matrix in the memory 205 (step S310).

In the aforementioned manner, in the case in which the space 500 is expanded and the cameras 201 are added, a new matrix is generated in accordance with such expansion and the addition of the cameras 201, and thus the installation locations of each of the light sources 102 within the space 500 can be easily acquired.

Further, the present disclosure is not limited to the aforementioned description of embodiments and figures, and appropriate modifications can be added to the aforementioned embodiments and figures.

For example, although the spatial locations and the shooting directions of the cameras 201a and 201b are taken to be calculable in the aforementioned embodiment, in the case in which the spatial locations of the cameras 201a and 201b are previously known, the present disclosure may be used for calculation of the shooting directions alone.

Further, although the memory 205 is made to remember the installation location within the space 500 of the first light source 300 in association with respective ID, visible light communication may be used, and the first light source 300 may emit light that is modulated by the installation location within the space 500.

For example, the first light source 300 and the second light source 102 are not limited to LEDs. For example, the light source may include a portion of the LCD, PDP, EL display, and the like included in the display device.

Further, the server 200 may be any type of device to which a camera is attached.

Further, an executable program on a computer-readable recording medium such as a flexible disc, compact disc read-only memory (CD-ROM), digital versatile disc (DVD), magneto-optical (MO) disc, and the like may be distributed, and the program may be installed to form a system that executes the aforementioned processing.

Further, the aforementioned program can be stored on a disc device or the like of a certain server on a communication network such as the Internet and, for example, can be superimposed on carrier waves and downloaded, or the like.

Moreover, in the case of realization of the aforementioned functions by execution allocated to an operating system (OS) or by execution in cooperation between the OS and an application, performance of the containing and distributing of the aforementioned recording medium alone, or downloading or the like, for the non-OS portion alone is permissible.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A location obtaining system comprising:
first light-emitting devices configured to emit light, each first light-emitting device of the first light-emitting devices disposed in a prescribed space;
a specifier configured to specify locations within the prescribed space of the first light-emitting devices;
a plurality of imaging devices configured to capture images of the prescribed space from mutually different directions; and
an obtainer configured to obtain an installation location or a shooting direction of each imaging device of the plurality of imaging devices based on (i) positions on the images of lights of the first light-emitting devices included in common in the images captured by the plurality of imaging devices, and (ii) locations within the prescribed space of the first light-emitting devices specified by the specifier
wherein:
the first light-emitting devices emit light modulated by information by which location of the local device within the prescribed space is uniquely specifiable,
the location obtaining system further comprises a decoder configured to decode the lights of the first light-emitting devices included in common in the images captured by the plurality of imaging devices into a location of the local device for each of the first light-emitting devices, and
the specifier specifies the location of the local device of each of the first light-emitting devices decoded by the decoder as a location within the prescribed space.

2. A location obtaining system comprising:
first light-emitting devices configured to emit light, each first light-emitting device of the first light-emitting devices disposed in a prescribed space;
a specifier configured to specify locations within the prescribed space of the first light-emitting devices;
a plurality of imaging devices configured to capture images of the prescribed space from mutually different directions;
an obtainer configured to obtain an installation location or a shooting direction of each imaging device of the plurality of imaging devices based on (i) positions on the images of lights of the first light-emitting devices included in common in the images captured by the plurality of imaging devices, and (ii) locations within the prescribed space of the first light-emitting devices specified by the specifier;
wherein the specifier specifies the location within the prescribed space from the images captured by each imaging device of the plurality of imaging devices for which the installation location or the shooting direction is previously associated;
a first determiner configured to determine whether an image of the prescribed space exits that is captured by an imaging device different from the plurality of imaging devices for which the installation location or the shooting direction is previously associated; and
a first controller configured to, upon determination by the first determiner that the image of the prescribed space exists, obtain the installation location or the shooting direction of the different imaging device based on (i) positions on the images of lights of the first light-emitting devices included in common in the images of the prescribed space captured by the different imaging device, and (ii) locations within the prescribed space of the first light-emitting devices specified by the specifier.

3. A location obtaining system comprising:
first light-emitting devices configured to emit light, each first light-emitting device of the first light-emitting devices disposed in a prescribed space;
a specifier configured to specify locations within the prescribed space of the first light-emitting devices;
a plurality of imaging devices configured to capture images of the prescribed space from mutually different directions;
an obtainer configured to obtain an installation location or a shooting direction of each imaging device of the plurality of imaging devices based on (i) positions on the images of lights of the first light-emitting devices included in common in the images captured by the plurality of imaging devices, and (ii) locations within the prescribed space of the first light-emitting devices specified by the specifier;

wherein the specifier specifies the location within the prescribed space from the images captured by each imaging device of the plurality of imaging devices for which the installation location or the shooting direction is previously associated;

a second determiner configured to determine whether an image captured by an imaging device different from the plurality of imaging devices is an image of another space including an image of the prescribed space; and a second controller configured to, upon affirmative determination by the second determiner, control the obtainer so as to calculate the installation location or the shooting direction of the different imaging device based on (i) positions on the images of lights of the first light-emitting devices occurring in the image of the other space including an image of the prescribed space captured by the other imaging device, and (ii) locations within the prescribed space of the first light-emitting devices specified by the specifier.

4. A location obtaining system comprising:

first light-emitting devices configured to emit light, each first light-emitting device of the first light-emitting devices disposed in a prescribed space;

a specifier configured to specify locations within the prescribed space of the first light-emitting devices;

a plurality of imaging devices configured to capture images of the prescribed space from mutually different directions;

an obtainer configured to obtain an installation location or a shooting direction of each imaging device of the plurality of imaging devices based on (i) positions on the images of lights of the first light-emitting devices included in common in the images captured by the plurality of imaging devices, and (ii) locations within the prescribed space of the first light-emitting devices specified by the specifier;

a converter configured to convert, from the installation location and the shooting direction of each imaging device obtained by the obtainer, positions of lights of the first light-emitting devices within the images captured by each imaging device into locations of the first light-emitting devices within the prescribed space;

a first acquirer configured to acquire, by causing imaging by each imaging device to image second light-emitting devices disposed anywhere within the prescribed space and emitting light modulated by the information by which location of the local device within the prescribed space is uniquely specifiable, the positions of the second light-emitting devices included in each of the captured images; and a location information acquirer configured to use the conversion matrix to acquire the location information within the prescribed space for the second light-emitting devices, from the positions of light of the second light-emitting devices acquired by the first acquirer.

5. A location obtaining system comprising:

first light-emitting devices configured to emit light, each first light-emitting device of the first light-emitting devices disposed in a prescribed space;

a specifier configured to specify locations within the prescribed space of the first light-emitting devices;

a plurality of imaging devices configured to capture images of the prescribed space from mutually different directions;

an obtainer configured to obtain an installation location or a shooting direction of each imaging device of the plurality of imaging devices based on (i) positions on the images of lights of the first light-emitting devices included in common in the images captured by the plurality of imaging devices, and (ii) locations within the prescribed space of the first light-emitting devices specified by the specifier;

a second acquirer configured to acquire a count of lights of the first light-emitting devices occurring in the captured images; and a setter configured to set a location analysis method based on the count of the lights acquired by the second acquirer, wherein the calculator calculates the installation locations of each imaging device of the plurality of imaging devices by the location analysis method determined by the setter.

6. A location obtaining device comprising:

a specifier configured to specify locations within a prescribed space of first light-emitting devices disposed within the prescribed space; and an obtainer configured to obtain an installation location or a shooting direction of each of a plurality of imaging devices capturing images, based on (i) positions on the images of lights of the first light-emitting devices included in common in the images of the prescribed space captured from mutually different directions, and (ii) locations within the prescribed space of the first light-emitting devices specified by the specifier wherein:

the first light-emitting devices emit light modulated by information by which location of the local device within the prescribed space is uniquely specifiable, the location obtaining device further comprises a decoder configured to decode into a location of the local device for each of the first light-emitting devices based on the light of the first light-emitting devices included in common in the captured images, and the specifier specifies as the locations within the prescribed space the location of the local device for each of the first light-emitting devices decoded by the decoder.

7. A location obtaining device comprising:

a specifier configured to specify locations within a prescribed space of first light-emitting devices disposed within the prescribed space;

an obtainer configured to obtain an installation location or a shooting direction of each of a plurality of imaging devices capturing images, based on (i) positions on the images of lights of the first light-emitting devices included in common in the images of the prescribed space captured from mutually different directions, and (ii) locations within the prescribed space of the first light-emitting devices specified by the specifier;

wherein the specifier specifies the locations within the prescribed space from images captured by each imaging device of the plurality of imaging devices for which the installation location or the shooting direction is previously associated;

a first determiner configured to determine whether, among the captured images, an image exists of the prescribed space captured by an imaging device different from the plurality of imaging devices for which the installation location or the shooting direction is previously associated; and a first controller configured to, upon determination of the first determiner that the image exists, control the calculator so as to obtain the installation location or the shooting direction of the other imaging device based on (i) a position of light of the first light-emitting devices occurring in images of the prescribed space captured by the different imaging device, and (ii) locations within the prescribed space of the first light-emitting devices specified by the specifier.

8. A location obtaining device comprising:

a specifier configured to specify locations within a prescribed space of first light-emitting devices disposed within the prescribed space;

an obtainer configured to obtain an installation location or a shooting direction of each of a plurality of imaging devices capturing images, based on (i) positions on the images of lights of the first light-emitting devices included in common in the images of the prescribed space captured from mutually different directions, and (ii) locations within the prescribed space of the first light-emitting devices specified by the specifier;

wherein the specifier specifies the locations within the prescribed space from images captured by each imaging device of the plurality of imaging devices for which the installation location or the shooting direction is previously associated;

a second determiner configured to determine whether, among the captured images, an image exists of another space that is not included in the images of the prescribed space; and a second controller configured to, upon affirmative determination by the second determiner, control the obtainer so as to obtain a different installation location or shooting direction based on (i) positions of the lights of the first light-emitting devices occurring in the image of the other space including the prescribed space, and (ii) locations of the first light-emitting devices within the prescribed space specified by the specifier.

9. A location obtaining device comprising:

a specifier configured to specify locations within a prescribed space of first light-emitting devices disposed within the prescribed space;

an obtainer configured to obtain an installation location or a shooting direction of each of a plurality of imaging devices capturing images, based on (i) positions on the images of lights of the first light-emitting devices included in common in the images of the prescribed space captured from mutually different directions, and (ii) locations within the prescribed space of the first light-emitting devices specified by the specifier;

a converter configured to convert, to the locations of the first light-emitting devices within the prescribed space, the positions of the lights of the first light-emitting devices in the images captured by each imaging device from the installation locations and the shooting directions of the plurality of imaging devices obtained by the obtainer;

a first acquirer configured to acquire positions of the second light-emitting devices included in each of the captured images by causing each imaging device of the plurality of imaging devices to capture images of the second light-emitting devices emitting light modulated by information by which the local device disposed anywhere within the prescribed space is uniquely identifiable; and a location information acquirer configured to use the conversion matrix to acquire location information of the second light-emitting devices within the prescribed space from positions of the lights of the second light-emitting devices acquired by the first acquirer.

10. A location obtaining device comprising:

a specifier configured to specify locations within a prescribed space of first light-emitting devices disposed within the prescribed space;

an obtainer configured to obtain an installation location or a shooting direction of each of a plurality of imaging devices capturing images, based on (i) positions on the images of lights of the first light-emitting devices included in common in the images of the prescribed space captured from mutually different directions, and (ii) locations within the prescribed space of the first light-emitting devices specified by the specifier second acquirer configured to acquire a count of the lights of the first light-emitting devices occurring in the captured images; and a setter configured to set a location analysis method based on the count of the lights acquired by the second acquirer, wherein the obtainer obtains the installation location of each of the plurality of imaging devices by the location analysis method set by the setter.

11. A location obtaining method comprising:

specifying locations in a prescribed space for light-emitting devices disposed within the prescribed space; and obtaining an installation location or a shooting direction of each of a plurality of imaging devices capturing images, based on (i) positions on the images of lights of the light-emitting devices included in common in the images of the prescribed space captured from mutually different directions, and (ii) the specified locations within the prescribed space of the light-emitting devices, wherein:

the first light-emitting devices emit light modulated by information by which location of the local device within the prescribed space is uniquely specifiable, the location obtaining system further comprises a decoder configured to decode the lights of the first light-emitting devices included in common in the images captured by the plurality of imaging devices into a location of the local device for each of the first light-emitting devices, and the specifier specifies the location of the local device of each of the first light-emitting devices decoded by the decoder as a location within the prescribed space.

12. A non-transitory computer-readable recording medium recording a computer-executable program of a location obtaining device connected to a plurality of imaging devices for capturing images from mutually different directions of a prescribed space in which light-emitting devices are disposed, the program causing the computer to function as:

a specifier configured to specify locations within the prescribed space of the light-emitting devices disposed within the prescribed space; and an obtainer configured to obtain an installation location or a shooting direction of each of the plurality of imaging devices capturing images, based on (i) positions on the images of lights of the light-emitting devices included in common in the images of the prescribed space captured from mutually different directions, and (ii) locations within the prescribed space of the light-emitting devices specified by the specifier wherein:

the first light-emitting devices emit light modulated by information by which location of the local device within the prescribed space is uniquely specifiable, the location obtaining system further comprises a decoder configured to decode the lights of the first light-emitting devices included in common in the images captured by the plurality of imaging devices into a location of the local device for each of the first light-emitting devices, and the specifier specifies the location of the local device of each of the first light-emitting devices decoded by the decoder as a location within the prescribed space.

* * * * *